Patented Sept. 28, 1954

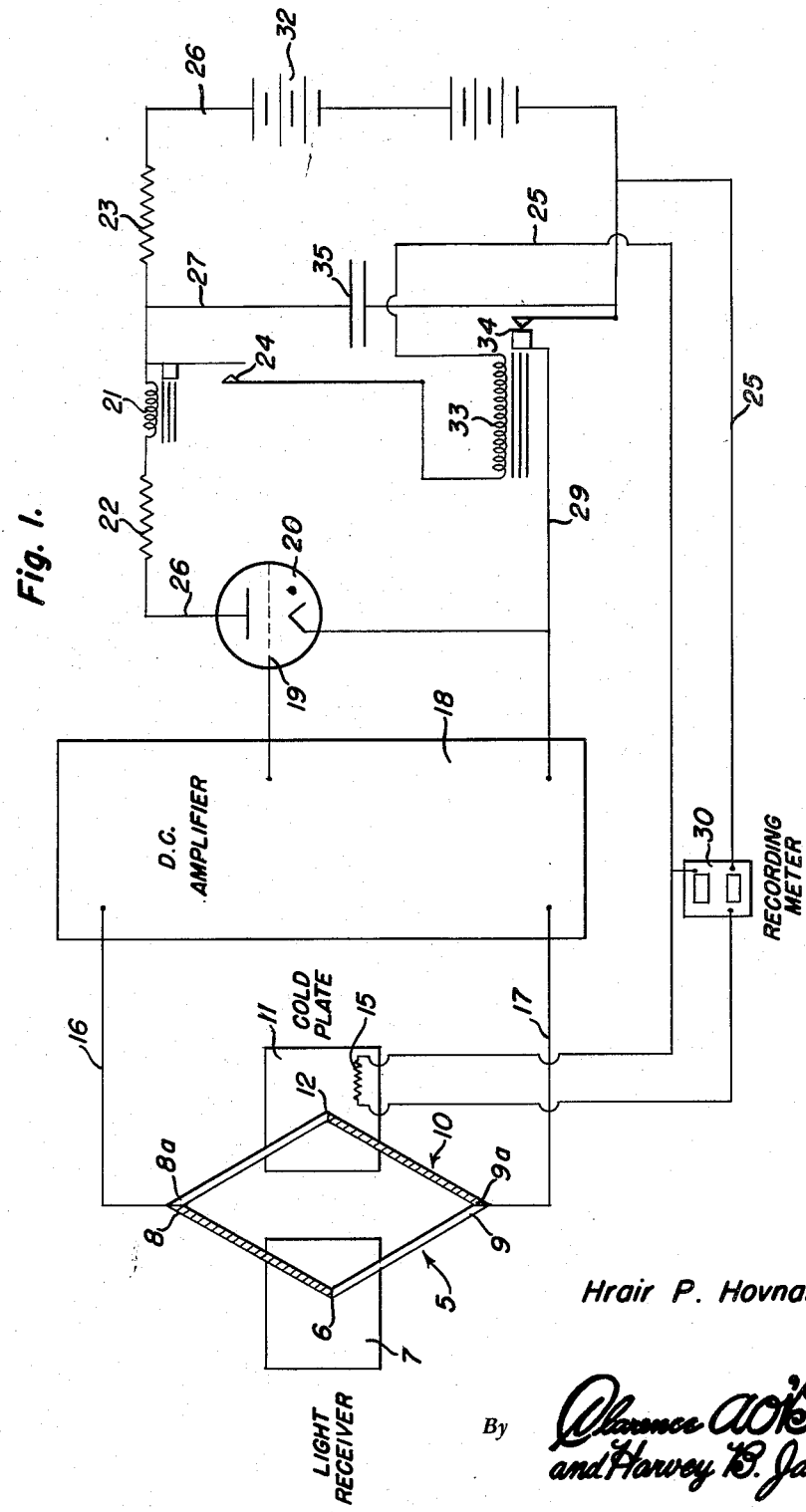

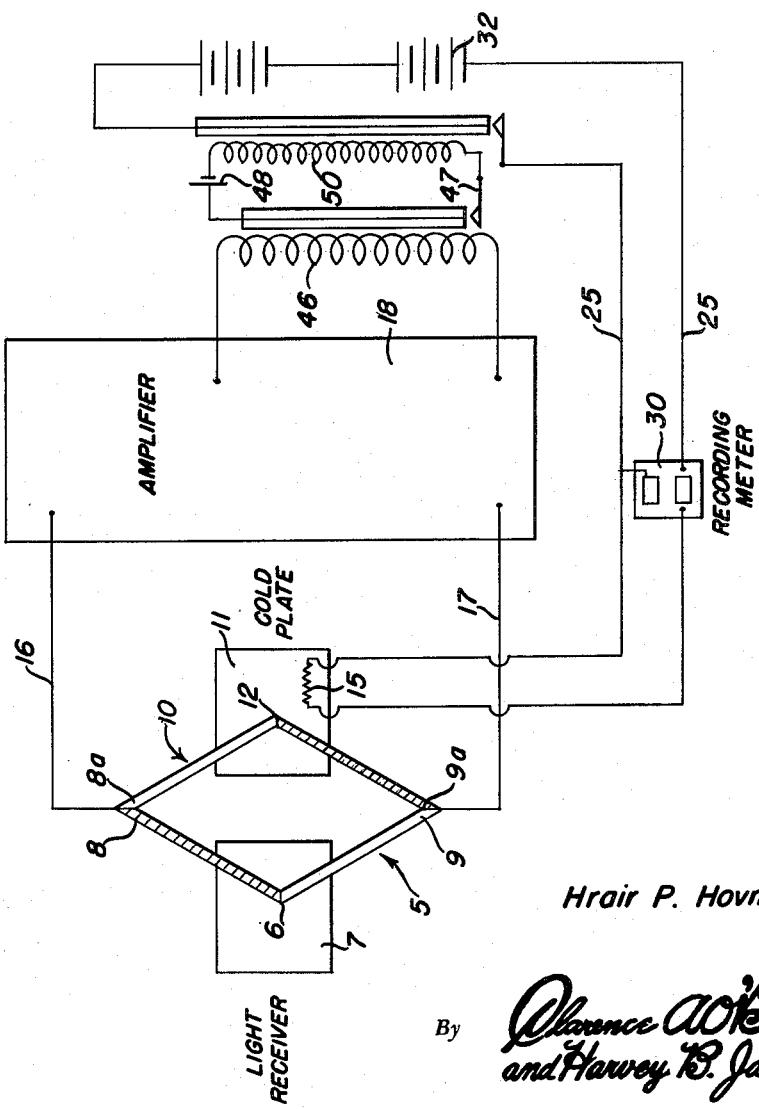

2,690,076

UNITED STATES PATENT OFFICE 2,690,076

INSTRUMENT FOR AUTOMATIC, INTEGRATING RADIATION MEASUREMENTS

Hrair P. Hovnanian, Winchester, Mass.

Application January 16, 1950, Serial No. 138,854

8 Claims. (Cl. 73—170)

This invention relates to radiation measuring instruments and more particularly to photometric instruments of the integrating type and it has for its primary object to provide an instrument for measuring radiant power and/or energy, such as for instance the power and/or energy of light per unit area, which instrument operates fully automatically and continuously and with a precision which is much higher than that obtainable with other instruments of this type.

In measuring and recording radiant power or energy such as, for instance, the power or energy of light emanating from an incandescent body, it is customary to measure the power, for instance the candle power, of the radiation either by comparative measurements or electrically. The former type of measurement requires the full and undivided attention of an observer for a comparatively extended period in order to produce a high degree of precision, while the latter method can only be carried into effect by means of a deflectional instrument, such as a galvanometer, the precision of which depends on the constancy of magnets, springs, bearings and on the level of the instrument. The degree of precision obtainable by means of the first named method therefore clearly depends on the skill of the operator, while the precision of the latter method depends on many factors, such as temperature, age and vibration affecting the precision to a varying degree. In both cases however, a highly trained or skilled observer is essential and indispensable.

Electric measurements of radiation are moreover mostly carried out by means of a photo-cell arrangement, the current generated in the photocell driving the measuring instrument. As these currents are weak, only instrument readings can be produced, but an automatic recording of sufficient precision is not obtainable.

According to the invention the above drawbacks and disadvantages of the known methods are eliminated and a fully automatic integrating operation is obtained by measuring the power or energy of the radiation by means of a pair of thermocouples one of which has its junction exposed to the radiation to be measured while the other ends are kept at the same temperature at which similar ends of the second thermocouple are kept; the second thermocouple is heated by a current finely controlled by the thermocurrent jointly produced by the pair, which heating current is cut off when the thermocurrents produced in the two thermocouples of the pair oppose each other and furnish a difference which is equal to nil. The radiant power and/or energy of the radiation impinging upon the first thermocouple can thus be measured by measuring the locally supplied electric power or energy necessary to heat the second couple to the point at which the difference is nil and the heating current is cut off.

As the measured local energy supply is entirely regulated by the apparatus itself and by the balancing of the currents produced by the two thermocouples it is an exact equivalent to the energy supplied by the radiation obtained in a fully automatic process. The operator need therefore not read the instrument after the initial adjustment if a recording instrument is used in the circuit.

The above described operation would be perfectly accurate and exact if the decrease in the voltage of the thermocurrent and the increase and decrease of the controlled local heating current would occur at the same time rate. This is however not the case and a direct control of the heating current in absolute proportionality to the voltage developed by the two thermocouples can therefore not be obtained with simple means, such as known, where high precision is required.

According to the invention a sufficient approximation deviating from the theoretical value only to an extent which may be made as small as desired, can be obtained by a control exercised either by means of relay switches or by means of an electronic tube operating with a trigger action and thereby switching the heating current on and off so as to form short impulses as long as the differential thermovoltage has a predetermined small value. Theoretical considerations then show that in this case, when only short timed impulses are used the approximation is sufficiently close for measurements giving the highest precision.

It is thus seen that it is one of the general objects of the invention to obtain a fully automatic operation of the instrument so that practically no activity of an observer is necessary during the recording of the values to be measured.

It is also seen that it is a further object of the invention to provide a high precision photometric instrument for the power or energy of the radiation in which a recording meter may continuously register the values which have been measured.

It is a still further object of the invention to provide a measuring instrument involving a trigger action, by means of which thermocurrents produced in a pair of thermocouples, one couple of which is exposed to a radiation, while the other is exposed to locally generated heat, may control the heating current furnishing the locally generated heat automatically to such an extent that the power or energy supplied by it to one thermocouple is exactly equal or proportional to the power or energy to be measured, the electrical power producing the locally generated heat being supplied by a series of impulses of short duration.

It is a still further object of the invention to provide means for carrying into effect the measurement of radiation, which includes a device operated by trigger action, the said action being exercised by thermocurrents opposing each other and generated by a thermocouple exposed to the radiant energy to be measured and by a couple exposed to a local heating means, said local heating means being heated by a series of impulses of short duration, automatically supplied by the trigger action device, said impulses continuing as long as the difference between the thermocurrents generated by the radiation to be measured and by the locally produced heat has not disappeared.

Further and more specific objects will be apparent form the following detailed specification.

The invention is illustrated in the accompanying drawings showing several embodiments of the invention and modifications thereof. It is however to be understood that the diagrams illustrating the invention only show examples by means of which the principle of the invention and the best modes of applying said principle may be explained. The diagrammatic examples will not give a survey over all the apparatus or devices which may be used in connection with the invention and modifications of the arrangements are therefore not necessarily departures from the essence of the invention.

In the drawings:

Figure 1 is a diagram illustrating one embodiment of the invention.

Figure 2 is a diagram illustrating another modification of the invention.

As has been briefly stated above radiation measurements by means of the instrument according to the invention are based on the generation of a current by thermoelectricity caused by the impinging of the radiation upon a thermocouple, the said radiation producing a raising of the temperature at the fused ends or hot junction of the thermocouple so as to generate a thermocurrent. An exactly similar thermocouple is connected in opposition to the first named thermocouple, the cold ends of both thermocouples being connected and exposed to the same temperature. However, the hot junction of the said second thermocouple is exposed to the heat radiating from or transmitted by an electric heater. The common leads of the two thermocouples connected in opposition carry a current controlling a local heating current for the aforesaid electric heater produced by a local source. As this control may be exercised with high precision the current supplied to the heater will be practically cut off in the moment in which the hot junction of the second thermocouple, exposed to the local heater, reaches a temperature which is equal to that of the first thermocouple and the wattage necessary to produce said heating is thus directly related to the radiant energy impinging on the first named thermocouple.

The methods of controlling the local heating current by means of the two opposing thermocurrents may vary considerably.

For high precision instruments attention has to be paid to the fact that the increase and decrease of the controlling currents and of the controlled currents occurs at different time rates and that therefore directly operating arrangements, while being fully automatic, would show a certain lack of precision. To obviate this defect it is preferable to use devices having a certain trigger action and, where high precision is required, to eliminate as far as possible the effect of the different time rates at which the currents vary by supplying the local heating energy in the form of short timed impulses continuing for a period of time which is determined by the trigger action of the thermocurrents. On account of the short duration of the local impulses the time rate at which the energy is delivered is not material.

Care however has to be taken to produce these impulses automatically. This is preferably obtained by an arrangement in which the heating energy is furnished by a condenser discharge, which is constantly interrupted by a relay operated by the discharge itself, so that the condenser will have time to recharge and will thus deliver impulses which are practically all of the same duration, power, and wattage. It is thus possible to obtain as close an approximation to absolute proportionality between the controlling thermocurrent difference and the controlled heating current as is desired.

The examples shown will clearly illustrate the above explained principles.

A thermocouple 5, hereinafter termed "radiation receiving thermocouple" is so arranged that the junction 6 at which the wires are fused and which is usually termed the "hot junction" rests on the radiation receiving plate 7 which is heated by the radiation to be measured, for instance by the light of the sun, if the instrument is used as a pyroheliometer. The cold ends 8, 9 which may be held at a definite temperature, for instance at 32° F. by means not shown, are connected or in contact with the cold ends 8a, 9a, of an exactly similar thermocouple 10, hereinafter termed the "compensating thermocouple." The hot junction 12 of the said thermocouple 10 rests on a cold plate 11 similar to the radiation receiving plate 7, which is however provided with an electric heater 15. The plate 11 and the hot junction 12 of the thermocouple 10 has of course to be protected against radiation.

The thermocouples may be of any approved type, for instance of the type using an alloy of Bi-Sn against an alloy of Bi-Sb. A couple of this type furnishes a yield of $120.10^{-6}$ volts per degree C.

As seen in Figure 1 the cold ends 8, 8a, 9, 9a of both thermocouples 5, 10 are connected with conductors 16, 17 which lead to the D. C. amplifier 18 which may be of any usual or approved electronic type and which need not be described. One of the many amplifying arrangements which may be used is described by H. Tatel and others in the Review of Scientific Instruments, vol. 9, No. 7, 1948. Another of these arrangements is described by Vance, ibid., vol. 7, No. 12, page 489, 1936.

The D. C. amplifier cooperates with a thyratron 20 which, as well known, is a tube with a trigger action, controlled by impulses exceeding a definite predetermined value. Moreover this tube can control relatively large amounts of power with a small input power. The thyratron 20 is operated in this case by the output voltage of the amplifier which is substantially proportional to the difference of the thermal voltages produced by the thermocouples.

The plate circuit 26 of the thyratron includes a relay 21 and resistances 22, 23. The relay 21 controls at its contact 24 a local circuit 25 powered by the condenser 35 and connected with a local battery 32 which may be identical with the plate circuit battery of the thyratron. This circuit 25 also includes the cold plate heater resistance 15.

Across the circuit 25 the recording meter 30 is connected by means of which the pharosage (radiant power per unit area) or the phosage (radiant energy per unit area) may be directly and accurately recorded. Moreover, the circuit 15 includes relay 33 controlling the contacts 34 which control the plate-cathode circuit 26—29 of the thyratron.

When the radiation receiving thermocouple 6 is heated by the radiation to be measured, the cold plate and the compensating thermocouple 10 being cold in this phase of the operation, a thermocurrent is flowing through the conductors 16, 17 and a voltage is built up between the points 8 and 9 which is amplified in the amplifier 18. The amplified voltage now acts on the grid 19 of the thyratron 20 which is non-conducting in its normal state. If a sufficient voltage has been built up in the amplifier the thyratron becomes conductive suddenly so that a surge of current will flow through the plate circuit 26 of the thyratron. The current surge passes relay 21 which closes contact 24, thus closing a discharge circuit for the condenser 35 which includes the circuit 25, the cold plate heater 15 and the relay 33. The meter 30 is connected across the circuit.

If relay 33 would not be in the circuit, the thyratron would continue to function and the current would flow through the heater continuously as long as the voltage in the amplifier is above the operating value of the grid voltage of the thyratron. Therefore the heater would be supplied with heat energy at a decreasing rate from the condenser and at a constant rate from the battery 32. The cold plate 11 would be heated to and beyond the temperature required for producing a compensating or neutralizing current in couple 10 on account of the different time rates at which the thermocurrents and the heater currents decrease and increase respectively. The accuracy of the measurement in this case would not be very high.

The relay 33 however, operates immediately upon the discharge of the condenser, as it is in the discharge circuit. It cuts out the thyratron, makes the relay 21 fall back and therefore also interrupts the heating circuit. The duration and also the energy of a single impulse is thus limited and is a constant factor. If one impulse is sufficient to heat the resistance 15 to the required extent, imparting to the compensating thermocouple 10 a temperature equal to that to which the radiation receiving thermocouple 6 has been heated, the operation ceases and the wattage furnished by the heating current is recorded on the recording meter.

If the temperature of the hot junction 12 of the couple 10 does not reach the required value, the operation is repeated, successive impulses are sent and recorded until the desired result is accomplished and the thyratron operation is cut off by the grid 19 being no longer provided with a biasing voltage, permitting the discharge of the tube 20.

The heating of the heater resistance 15 by impulses eliminates the influence of the different time rates of the thermocurrent increase and decrease of the condenser discharge, and of the heating current increase and decrease, as the impulses are short timed and the difference between the time rates therefore becomes negligible. The duration of the impulses is adjustable to the desired extent by selecting the condenser dimensions and also the inductances in the circuits properly.

Instead of recording the wattage the number of impulses may be recorded if care is taken that the impulses have all the same duration and wattage.

The modification illustrated in Figure 2 shows an arrangement in which the trigger action is solely obtained by electromagnetic switches thus dispensing with the thyratron.

In this modification two successive steps to switch in the heating current are used. The first switch is formed by the relay switching device 46 which operates as soon as a sufficient voltage has been built up and closes the circuit 47 containing a source of current 48 and the relay switch 50. The latter closes the heating circuit 25 containing the resistance 15, a source of current 32 and the recording meter 30 which in this case must be a wattmeter.

The modifications described, as above stated, are designed for different degrees of precision.

All the modifications shown however, embody the principle to use thermocouples generating opposing currents and kept at the same temperature at one end, one of said couples being acted upon by the radiation to be measured, while the other thermocouple is acted upon by a heater supplied by electric current, which is controlled by the difference of the thermocurrents generated by the thermocouples in such a manner that a value of the difference which is larger than nil will start and a difference equal to nil will stop the flow of heating current. Under these conditions the wattage of the current supplied which may be read on or recorded by a suitable meter or counter, if impulses of a known wattage are delivered, is directly proportional to the pharosage (radiant power per square unit) or to the phosage (radiant energy per square unit) determining the temperature rise in the radiation receiving thermocouple. As the instrument is completely automatic it may operate either with or without an operator.

On account of the automatic operation the instrument may be used for meterological and for radiation measurements connected with all kinds of radiation; but it may also be used for industrial purposes as a pyrometer in those cases where great accuracy is required or for the purpose of measuring or controlling an illumination or irradiation automatically.

Further applications will suggest themselves to the expert skilled in this art.

It is to be understood that while the instrument has been described as an instrument for measuring the pharosage (power per unit area) or for the measurement of phosage (energy per unit area) it may also be adapted for the measurements of other units.

Further it is to be understood that the construction of the units employed such as the amplifier, relay switches, etc., is unessential and that changes will not affect the essence of the invention.

Having described the invention, what is claimed as new is:

1. An integrating radiation measuring instrument comprising a pair of thermocouples with joined ends connected for generating currents of opposite sign, one thermocouple being exposed at the fused ends to the radiation to be measured, the other couple of the pair being heatable at the fused end by locally produced heat, the joined ends being exposed to the same constant temperature, the thermo-currents, when the fused ends are at the same temperature, neutralizing each other, while a differential voltage appears across the joined ends of the thermocouples when the fused ends of the thermocouples are unequally heated, an electric heater adapted to produce the heat for influencing the thermocouple exposed to locally produced heat, a source of heating currents, a heater circuit for connecting said heater and said source of current, an intermittently operative electronic tube with a grid, the grid bias voltage of which controls the conductivity and the flow of current through said tube, an operative circuit for said electronic tube, including a plate circuit, means in said plate circuit for controlling the circuit connecting the heater with the source of currents, means in said aforesaid heater circuit for producing short timed impulses in the same, when the electronic tube is conductive, said means including a relay in the heater circuit controlling the operative circuit of the electronic tube, means for controlling the grid bias of the grid of the electronic tube by the differential voltage of the thermo-currents appearing between the joined ends of the thermocouples, the addition of a differential voltage to the grid bias making the electronic tube conductive, the means in said plate circuit being operative to close the said heater circuit when the electronic tube is conductive said circuit being again broken upon energization of the heater circuit, and this pulse producing making and breaking continuing as long as the electronic tube is conductive, and an integrating meter for measuring the integrated electric power delivered by the current impulses to the electric heater during the time during which the circuit was closed.

2. An integrating radiation measuring instrument comprising a pair of thermocouples with joined ends connected for generating currents of opposite sign, one thermocouple being exposed at the fused ends to the radiation to be measured and the fused end of the other thermocouple being heatable by locally produced heat, the joined ends being held at the same constant temperature, the thermo-currents of the two couples neutralizing each other when the temperatures of the fused ends are equal, while a differential voltage appears between the two joined ends in the event of a temperature difference between the fused ends of the thermocouples, an electric heater adapted to produce the heat which the heatable thermocouple receives, a local source of currents supplying a heating current, a heater circuit connected with said source, a relay switch for controlling said heater current, means for limiting the supply of heating current to the electric heater to the value necessary for heating the thermocouple exposed to local heat to the same temperature to which the thermocouple exposed to radiation was heated, said means including a voltage responsive further relay switch controlling the operation of the first named relay switch, said further relay switch being operated by the differential voltage of the thermo-currents appearing at the joined ends of the two thermocouples, said switch when operated maintaining the first named relay switch closed as long as the differential voltage has a value different from nil, the first named relay switch being opened when the differential voltage is equal to nil, and a meter for measuring the total heating current consumption of the heater, heating the locally heated thermocouple.

3. An integrating radiation measuring instrument comprising two thermocouples, each having fused ends and a pair of open ends with the open ends of the thermocouples being joined so that currents generated by the fused ends oppose each other, the fused ends of one of the joined thermocouples of the pair being exposed to the radiation to be measured and the fused ends of the other thermocouple of the pair being heatable by locally produced heat, the joined ends of both thermocouples being held at a constant temperature, an electric heater for producing said locally produced heat to be transmitted to the last named thermocouple, a heating circuit and a source of electrical energy for energizing said heating circuit, means responsive to a difference in potential between the joined ends to energize the heating circuit when such difference in potential exists to bring the heatable thermocouple, heated by the electric heater, to a temperature at which it generates currents of the same magnitude and of opposite sign to those produced in the thermocouple whose fused ends are exposed to radiation, said last named means including means operated by the differential voltage developed at the joined end of the pair of thermocouples for making and breaking the said heating circuit, and for definitely de-energizing said heating circuit when the differential current at the joined ends of the thermocouples disappears, and an integrating meter in said heating circuit measuring the total electrical energy locally furnished to the electric heater.

4. An integrating radiation measuring instrument comprising a pair of thermocouples joined at their ends and generating currents of opposite sign at these joined ends, the fused end of one of said thermocouples of the pair being exposed to the radiation to be measured, the fused end of the other thermocouple of the joined pair being heatable by locally produced heat, and the joined ends of the pair being held at the same constant temperature, an electric heater, a heating circuit for producing heat in the electrical heater, the heat produced in the heater being transmitted to the fused end of the heatable thermocouple of the pair, the pair of thermocouples when their fused ends are exposed to the same temperature producing currents neutralizing each other and when exposed to different temperatures generating a differential current at their joined ends, means connected with said joined ends of the pair for controlling the heating of the electric heater, said last named means including means operated by the production of a differential voltage at the joined ends of the pair of thermocouples for making and breaking the heater circuit continuously so as to produce a series of present pulses transmitted to the electrical heater, said means operated by the differential voltage generated at the joined ends of the thermocouples closing said heating circuit after each electrical current pulse during the production of a differential voltage at the joined ends of the thermocouples, but maintaining the heating circuit in open condition when the differential voltage disappears thus automatically cutting off the supply of further electrical energy upon reaching a state of neutralization of the thermo-currents of the pair, and an integrating meter in said heating circuit measuring the total electrical energy locally produced and supplied to said heater.

5. An integrating radiation measuring instrument comprising a pair of thermocouples joined at their ends to generate currents of opposite sign producing a differential voltage if said currents are unequal, the fused end of one of the thermocouples thus joined being exposed to the radiation to be measured and the other thermocouple being heatable by locally produced heat, the joined ends of the pair being kept at the same constant temperature, an electric heater adapted to produce heat for influencing the last named thermocouple, a source of heating current and a heating circuit connecting said heater and said source of current, circuit interrupting impulse producing means in said heating circuit, adapted to supply short timed pulses delivered at predetermined intervals to said heater, voltage responsive means connected with the joined ends of the pair of thermocouples, said voltage responsive means being controlled by the differential voltage produced at the joined ends if the pair of the thermocouples are heated unequally, said voltage responsive means operating the said circuit making and breaking means in the heating circuit and closing the said circuit after each breaking of the circuit during the existence of a differential voltage, while opening the said circuit definitively upon disappearance of a differential voltage, and an integrating meter for measuring the total electric power of the current impulses delivered to the electric heater.

6. An integrating radiation measuring instrument comprising a pair of thermocouples joined at their open ends and connected to generate currents of opposite sign, the fused end of one thermocouple of the pair being exposed to the radiation to be measured, and the fused end of the other thermocouple of the pair being heatable by locally produced heat, the joined ends of the pair being kept at a common constant temperature and the thermo-currents produced in the pair neutralizing each other when the fused ends of the thermocouples are at an equal temperature, a differential voltage appearing when the temperatures are unequal, an electric heater adapted to produce the locally produced heat for the last named thermocouple, a source of heating currents, a heating circuit for connecting said heater and said source of currents, an intermittently operative electronic tube with a grid, the grid bias voltage of which controls the conductivity and the flow of current through said tube, an operative circuit for said electronic tube, including a plate circuit, means in said plate circuit for controlling the heating circuit, the grid bias of the grid of the electronic tube being controlled by the differential voltage of the thermo-currents produced by the pair of joined thermocouples, so that the electronic tube is conductive upon appearance of a differential voltage and non-conductive upon disappearance of a differential voltage, means for automatically interrupting the operative circuit of the electronic tube after its energization, the heating circuit control means in said plate circuit being operative to keep the said heating circuit closed when the electronic tube is conductive and to break it upon cut off of the tube circuit due to disappearance of a differential voltage, and a meter for measuring the total current consumption of the electric heater during the time during which the heating circuit was closed.

7. In an integrating measuring instrument as claimed in claim 6 in addition, an impulse producing relay inserted in the heater circuit, said impulse relay controlling the current flow in the operative circuit of the electronic tube so as to operate the same intermittently.

8. An integrating radiation measuring instrument comprising a pair of thermocouples joined at their ends and connected to produce currents of opposite sign, one thermocouple of the pair being exposed at the fused end to the radiation to be measured and the other thermocouple of the pair being heatable by locally produced heat, the joined ends of the pair being kept at the same constant temperature, the thermo-currents of the pair neutralizing each other when the fused ends of both thermocouples are at the same temperature, while a differential voltage appears across the joined ends when the temperatures at the fused ends are unequal, an electric heater adapted to produce heat for influencing the last named thermocouple, an intermittently operated electronic tube provided with a cathode and anode and with a grid, the grid bias voltage of which controls the conductivity of the tube, said grid being connected with the joined ends of the pair of thermocouples and the appearance of a differential voltage producing a grid bias making the tube conductive, an operative circuit for said electronic tube including a plate circuit, a source of currents, a condenser connected across the electronic tube in said operative circuit of the electronic tube, a heater circuit connecting both sides of the said condenser with the electric heater to provide the heater with the heating current upon discharge of the condenser, a relay in the plate circuit of the electronic tube controlled by the flow of current through the said tube, and controlling the connection of the heater circuit with said condenser, said relay thus producing heating impulses and being operative to close the condenser discharge and heater circuit when the electronic tube is conductive, while breaking the heater circuit upon disappearance of a differential voltage producing a grid bias making the tube conductive, and an integrating meter for measuring the total sum of the electric power of the current impulses delivered to the electric heater during the time during which the circuit was closed.

References Cited in the file of this patent

UNITED STATES PATENTS

| Number | Name | Date |
| --- | --- | --- |
| 1,863,373 | Harrison | June 14, 1932 |
| 2,113,928 | Behr | Apr. 12, 1938 |
| 2,169,101 | La Pierre | Aug. 8, 1939 |
| 2,305,396 | Volochine | Dec. 15, 1942 |
| 2,349,436 | Keeler | May 23, 1944 |
| 2,398,606 | Wang | Apr. 16, 1946 |
| 2,556,841 | Farnell | June 12, 1951 |